(12) United States Patent
Ohnishi

(10) Patent No.: US 9,751,333 B2
(45) Date of Patent: Sep. 5, 2017

(54) SUBLIMATION DYE INK PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/436,476

(22) PCT Filed: Oct. 22, 2013

(86) PCT No.: PCT/JP2013/078616
§ 371 (c)(1),
(2) Date: Apr. 16, 2015

(87) PCT Pub. No.: WO2014/065295
PCT Pub. Date: May 1, 2014

(65) Prior Publication Data
US 2015/0273867 A1    Oct. 1, 2015

(30) Foreign Application Priority Data
Oct. 24, 2012    (JP) .................................. 2012-235089

(51) Int. Cl.
*B41J 11/00* (2006.01)
*B41M 5/382* (2006.01)
(Continued)

(52) U.S. Cl.
CPC .......... *B41J 11/002* (2013.01); *B41M 5/0023* (2013.01); *B41M 5/382* (2013.01);
(Continued)

(58) Field of Classification Search
CPC ... B41M 5/035; B41M 5/44; B41J 2/01; B41J 11/002
See application file for complete search history.

(56) References Cited

U.S. PATENT DOCUMENTS 5,446,082 A * 8/1995 Asai ..................... B41M 5/5272
347/105
6,147,139 A * 11/2000 Shaw-Klein ........... C09D 11/03
428/32.1
(Continued)

FOREIGN PATENT DOCUMENTS

| EP | 0929615 | 7/2000 |
|----|---------|--------|
| JP | S50-65678 | 6/1975 |

(Continued)

OTHER PUBLICATIONS

"International Search Report (Form PCT/ISA/210)", mailed on Jan. 28, 2014, with English translation thereof, pp. 1-2.
(Continued)

*Primary Examiner* — Stephen Meier
*Assistant Examiner* — John P Zimmermann
(74) *Attorney, Agent, or Firm* — Jianq Chyun IP Office

(57) ABSTRACT

The invention has an object to provide a printing method wherein a wide variety of recording medium can be used, and printed materials richer and more vivid in color can be obtained by using sublimation dyes. To achieve the object, provided is a printing method including: an ink applying step for applying an ink on a recording medium (100), and the ink contains a solvent, a binder resin (11) dispersed or emulsified in the solvent, and a sublimation dye (12) entrained in particles of the binder resin (11); and a heating step for heating the ink to diffuse the sublimation dye (12) among the particles of the binder resin (11) for color development.

8 Claims, 1 Drawing Sheet

(51) Int. Cl.
*B41M 5/00* (2006.01)
*C09D 11/328* (2014.01)
*C09D 11/104* (2014.01)
*D06P 5/30* (2006.01)

(52) U.S. Cl.
CPC .......... *C09D 11/104* (2013.01); *C09D 11/328* (2013.01); *B41M 2205/02* (2013.01); *B41M 2205/30* (2013.01); *D06P 5/30* (2013.01)

(56) References Cited

U.S. PATENT DOCUMENTS

| | | | | |
|---|---|---|---|---|
| 6,387,846 | B1* | 5/2002 | Shinozaki | B41M 5/38207 |
| | | | | 347/188 |
| 2002/0062761 | A1* | 5/2002 | Odaka | B41M 5/392 |
| | | | | 106/31.29 |
| 2002/0100387 | A1* | 8/2002 | Churchwell | B29C 45/14688 |
| | | | | 101/488 |
| 2004/0266620 | A1* | 12/2004 | Sugita | B41M 5/395 |
| | | | | 503/227 |
| 2009/0011352 | A1* | 1/2009 | Cooper | 430/108.1 |
| 2011/0169901 | A1* | 7/2011 | Pinto | D06P 1/5235 |
| | | | | 347/101 |

FOREIGN PATENT DOCUMENTS

| | | |
|---|---|---|
| JP | 5-039447 | 2/1993 |
| JP | 2002-079751 | 3/2002 |
| JP | 2002138231 | 5/2002 |

OTHER PUBLICATIONS

"Office Action of China Counterpart Application", issued on Dec. 4, 2015, pp. 1-13, with English translation thereof.

"Search Report of European Counterpart Application", issued on Jun. 26, 2015, p. 1-p. 7.

"Office Action of Japan Counterpart Application" with English translation, issued on Aug. 23, 2016, p. 1-p. 8.

* cited by examiner

SUBLIMATION DYE INK PRINTING METHOD

CROSS-REFERENCE TO RELATED APPLICATION

This application is a 371 application of an international PCT application serial no. PCT/JP2013/078616, filed on Oct. 22, 2013which claims the priority benefit of Japan application no. 2012-235089, filed on Oct. 24, 2012. The entirety of each of the above-mentioned patent applications is hereby incorporated by reference herein and made a part of this specification.

TECHNICAL FIELD

The invention relates to a printing method.

BACKGROUND ART

The patent document 1 discloses a sublimation dyeing technique. This technique uses a sublimation dye-containing ink and an inkjet absorbing film which is a film article having thereon a resin layer and an inkjet absorbing layer, wherein the film is printed with the ink and then heated.

PRIOR ART DOCUMENT

Patent Document

Patent Document 1: JP 2002-79751 A (disclosed on Mar. 19, 2002)

SUMMARY OF THE INVENTION

Problems to be Solved by the Invention

A conventional problem with sublimation dye-containing inks is fewer recording medium printable with these inks. There is a strong need for printing methods wherein the sublimation dyes can develop their colors more vividly.

The invention was accomplished to solve this conventional problem. To this end, the invention provides a printing method wherein a wide variety of recording medium can be used, and printed materials richer and more vivid in color can be obtained by using sublimation dyes.

Solutions to the Problems

A printing method according to the invention includes: an ink applying step for applying an ink on a recording medium and the ink contains a solvent, a binder resin dispersed or emulsified in the solvent, and a sublimation dye entrained in particles of the binder resin; and a heating step for heating the ink applied on the recording medium to diffuse the sublimation dye among the particles of the binder resin for color development.

The ink containing the binder resin dispersed or emulsified in the solvent, generally called latex ink, is available for a variety of recording medium because the binder resin is favorably adherable to many different recording medium. The heating step diffuses the sublimation dye in the binder resin, for advantageously promoting coloring of the whole binder resin. As a result, printed materials richer and more vivid in color can be obtained. The printing method of the invention, therefore, can use a wide variety of recording medium and provide printed materials richer and more vivid in color by using the sublimation dyes.

In the printing method according to the invention, the binder resin preferably contains a thermally pliable or thermoplastic polyester-based resin in a content equal to or greater than 50 wt % as a primary component thereof.

The sublimation dye can easily permeate into the polyester-based resin during the heating step. Therefore, the resulting printed materials are even richer and more vivid in color.

In the printing method according to the invention, the heating step preferably heats the recording medium to a temperature equal to or higher than 100° C. and equal to or lower than 200° C.

At temperatures within the range, the sublimation dye can diffuse better among the particles of the polyester-based resin. Thus, the printed materials even richer and more vivid in color can be obtained.

In the printing method according to the invention, the recording medium is preferably formed from a material that promotes the sublimation dye to diffuse in the recording medium when heated during the heating step.

Since the sublimation dye is diffused in the recording medium as well, the obtained printed materials are excellent in resistance to scuffing.

In the printing method according to the invention, the recording medium is preferably formed from a polyester-based resin.

The sublimation dye can easily permeate into the polyester-based resin of the recording medium during the heating step. Thus, the obtained printed materials are accordingly excellent in resistance to scuffing.

Advantageous Effects of the Invention

Thus, the printing method of the invention can advantageously use a wide variety of recording medium and provide printed materials richer and more vivid in color by using the sublimation dyes.

BRIEF DESCRIPTION OF THE DRAWINGS

FIGS. 1A and 1B are drawings associated with a printing method according to an embodiment of the invention, for illustrating the process of color development of an ink that struck a recording medium, wherein FIG. 1A is a drawing of a state subsequent to an ink applying step, and FIG. 1B is a drawing of a whole binder resin dyed with a sublimation dye.

DESCRIPTION OF THE EMBODIMENTS

Figure 1:
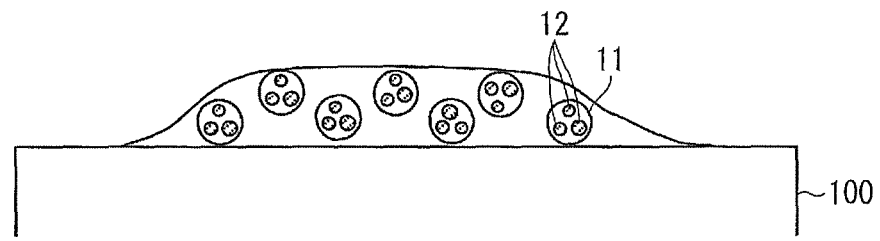
Figure 1:
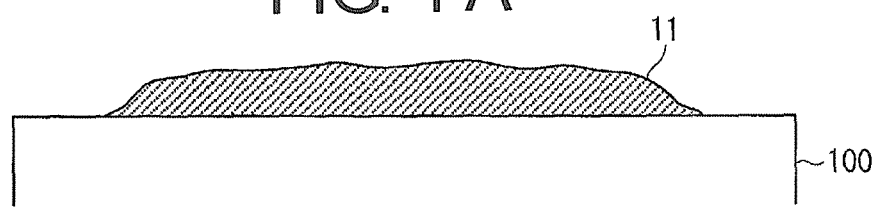

A printing method according to the invention is described referring to FIGS. 1A and 1B. FIGS. 1A and 1B are drawings associated with a printing method according to an embodiment of the invention, for illustrating the process of color development of an ink that struck a recording medium.

The printing method according to the invention includes: an ink applying step for applying an ink on a recording medium and the ink contains a solvent, a binder resin dispersed or emulsified in the solvent, and a sublimation dye entrained in particles of the binder resin; and a heating step for heating the ink applied on the recording medium to diffuse the sublimation dye among the particles of the binder resin.

The ink containing the binder resin dispersed or emulsified in the solvent, generally called latex ink, is available for a variety of recording medium because the binder resin is favorably adherable to many different recording medium. And, the heating step diffuses the sublimation dye in the binder resin, for advantageously promoting coloring of the whole binder resin. As a result, printed materials richer and more vivid in color can be obtained.

The invention is further advantageous in that a transfer medium, such as the film used in the patent document 1, are no longer necessary.

[Ink]

The ink used in the printing method according to the invention contains a solvent, a binder resin, and a sublimation dye. The binder resin is dispersed or emulsified in the solvent, and the sublimation dye is entrained in particles of the binder resin. For example, each particle of the binder resin 11 contains particles of sublimation dye 12 as illustrated in FIG. 1A.

And, the ink with the binder resin dispersed or emulsified in the solvent is also called "latex ink" in this description.

The sublimation dye may be selected from the conventionally available sublimation dyes. The sublimation dye to be used is suitably decided depending on what the ink composition is used for.

Examples of the solvent include but are not limited to water and hydrophilic solvents.

When water is used as the solvent, the resin is emulsified or suspended in water. Therefore, the ink may also be called "aqueous latex ink". It may well be said that an aqueous latex ink contains an aqueous emulsion or an aqueous suspension formed by the binder resin.

The binder resin used in the invention is a material in which the sublimation dye contained therein is diffused by heating. The sublimation dye heated in the heating step described later, therefore, dyes the whole binder resin, and the resulting printed material is richer and more vivid in color.

The binder resin to be used is suitably selected depending on types of the recording medium. The recording medium may be one selected from textiles of various types; polyester, acrylic, cotton, silk, hide, acetate, Nylon (registered trademark), polylactic acid, and Teflon (registered trademark). The recording medium may also be one selected from lumbers, papers, glass, metals, stones, polycarbonate, ABS, acrylonitrile, butadiene, styrene, and vinyl chloride. Printing on textiles with the sublimation dyes conventionally entails pretreatment of the textile surfaces, for example, coating the surfaces with adhesive paste. According to the invention, recording medium of various types including textiles can directly be used for printing. Polyester textiles are particularly preferable recording medium to which the binder resin is tightly adherable.

Examples of the binder resin are water-soluble vinyl-based resins, acrylic resins, alkyd-based resins, polyester-based resins, polyurethane-based resins, silicon-based resins, fluororesins, epoxy-based resins, phenoxy-based resins, polyolefin-based resins, Nylon (registered trademark), vinylon, acetate, polylactic acid, and modified resins of these examples. Of these examples, acrylic resins, water-soluble polyurethane-based resins, water-soluble polyester-based resins, and water-soluble acrylic resins are particularly preferable.

The binder resin contained in the ink used in the printing method according to the invention is preferably a polyester-based resin, and more preferably a thermally pliable or thermoplastic polyester-based resin. A particularly preferable example is polyester. Because the polyester-based resin is a material in which the sublimation dye is easily diffusible, the resulting printed materials are even richer and more vivid in color.

The resin contained in the latex ink may be a resin solely used or may be combination of two or more different resins. The resin content may be optionally decided depending on the type of the resin desirably used. Of the whole quantity of the aqueous latex ink, the resin content is preferably, for example, equal to or greater than 1 wt. %, and more preferably equal to or greater than 2 wt. %. Moreover, the resin content is preferably equal to or less than 20 mass %, and more preferably equal to or less than 10 mass %.

Since the latex ink is material curable by drying or heating, the heating step described later induces curing of the latex ink.

The latex ink may further contain an emulsifier to emulsify or suspend the resin.

The solvent of the latex ink may contain another resin dissolvable in the solvent in addition to the emulsified or suspended resin. The another resin possibly added may be dissolved in the solvent to adjust the viscosity of the ink. After the ink is dehydrated by drying, a film is formed by bonding particles of the emulsified or suspended binder resin. At the time, the another resin serves as a binding material that further strengthens the bond between the particles of the emulsified or suspended binder resin.

A preferable method to produce the binder resin containing the sublimation dye may be suspension polymerization technique. Describing the technique, a solution containing the binder resin, a monomer or oligomer, and the sublimation dye are mixed to prepare a suspension, and the suspension with the sublimation dye and the binder resin dispersed therein is sprayed into a liquid bath immiscible with the binder resin and then agitated to prepare an emulsion. Then, the binder resin-containing material is cured by, for example, emulsion polymerization.

[Ink Applying Step]

In the ink applying step, the prepared ink is applied on the recording medium. FIG. 1A is a drawing of the recording medium subsequent to the ink applying step. The binder resins 11 containing the sublimation dyes 12 are spread on a medium 100. The binder resins 11 are dispersed in a solvent such as water and/or a dispersing agent.

The inkjet technique, for example, may be employed to spread the ink. The inkjet technique makes it easy to spread the prepared ink on the medium 100.

The recording medium used in the printing method according to the invention may be any one selected from various medium formed from, for example, paper, textiles, glass, metals, and resins because the binder resin is favorably adherable to many different recording medium. A particularly preferable example of the recording medium is formed from a material that promotes the sublimation dye to diffuse in the recording medium when heated during the heating step. The reason is that since the sublimation dye is diffused in the recording medium as well, the obtained printed materials are excellent in resistance to scuffing. A particularly preferable example of the resin is polyester because the sublimation dye can easily permeate into this material. The obtained printed material is accordingly excellent in resistance to scuffing. In FIGS. 1A and 1B, an example in which paper is used as the medium 100 is depicted.

[Heating Step]

During the heating step, the ink applied on the recording medium is heated to diffuse the sublimation dye contained in the ink among particles of the binder resin. As a result, the obtained printed materials are even richer and more vivid in color.

As illustrated in FIG. 1B, heating the ink diffuses the sublimation dye in the dissolved binder resin 11, for dying the whole binder resin 11 with the sublimation dye. Therefore, the obtained printed materials are even richer and more vivid in color.

To heat the ink, the surface of the recording medium is heated by, for example, a heater.

The ink may be heated at suitable temperatures depending on types of the binder resin and desirable printing quality. When, for example, a polyester-based resin is used as the binder resin, the ink containing a polyester-based resin with a relatively small molecular weight is heated at low temperatures. On the other hand, the ink containing a polyester-based resin with a relatively large molecular weight is heated at high temperatures. To be specific in consideration of possible thermal damage to any used textile, the surface of the recording medium is preferably heated in a range which is equal to or higher than 100° C. and equal to or lower than 240° C., and more preferably heated in a range which is equal to or higher than 100° C. and equal to or lower than 200° C. At temperatures within the range, the sublimation dye can diffuse better among the polyester particles, for successfully obtaining printed materials even richer and more vivid in color. In the case of using a polyester-based medium in an example described later, heating the medium to 240° C. allows the sublimation dye to permeate more rapidly into the medium, for improving the productivity. On the other hand, heating the medium to 200° C. allows the sublimation dye to diffuse better among the particles of the polyester-based resin used as the binder resin.

[Modified Embodiment]

Figure 2:
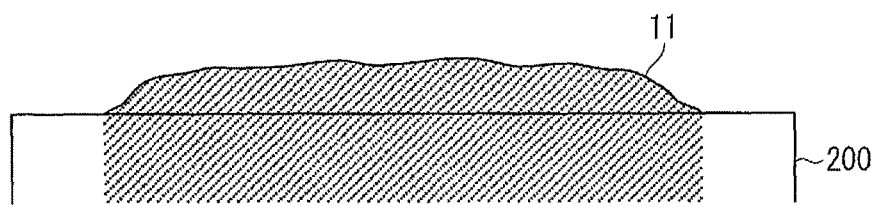
FIG. 2 is a drawing schematically illustrating the structure of a printed material obtained by a printing method according to another embodiment of the invention.

An example in which the recording medium is a medium formed from a polyester-based resin or a polyester textile is described referring to FIG. 2. FIG. 2 is a drawing schematically illustrating the structure of a printed material obtained by a modified embodiment of the invention.

FIG. 2 is a drawing of a binder resin 11 and a medium 200 subsequent to the heating step. The medium 200 is formed from a polyester-based resin.

Subsequent to the heating step, the sublimation dye contained in the binder resin 11 permeates into the dissolved binder resin 11 and the medium 200. As a result, the whole particles of the binder resin 11 and the surface of the medium 200 are dyed with the color-developed sublimation dye. Since the sublimation dye has partly permeated into the surface of the medium 200, color loss of the medium is unlikely even if its surface is scuffed. Thus, the obtained printed materials are excellent in resistance to scuffing.

[Additional Notes]

As described thus far, the printing method according to the embodiment of the invention includes: an ink applying step for applying the ink on the medium 100, and the ink contains the solvent, binder resins 11 dispersed or emulsified in the solvent, and sublimation dyes 12 entrained in particles of the binder resins 11; and a heating step for heating the ink applied on the medium 100 to diffuse the sublimation dyes 12 among the particles of the binder resins 11 for color development.

The ink containing the binder resins 11 dispersed or emulsified in the solvent, generally called latex ink, is available for medium 100 of a variety of materials because the binder resin 11 is favorably adherable to the various medium 100. The heating step diffuses the sublimation dyes 12 in the binder resins 11, for advantageously promoting coloring of the whole binder resins 11. Even if any one of such materials that are conventionally difficult to develop colors such as cotton fabrics, metals, and glass is used, printed materials thereby obtained are all richer and more vivid in color. The printing method of the invention is, therefore, available for a wide variety of recording medium 100, and providing printed materials richer and more vivid in color by using the sublimation dyes 12.

The printing method according to the embodiment of the invention uses a polyester-based resin as the binder resin 11.

The sublimation dyes 12 can easily permeate into the polyester-based resin during the heating step. Therefore, the resulting printed materials are even richer and more vivid in color.

The printing method according to the embodiment of the invention heats the recording medium 100 in the heating step to a temperature equal to or higher than 100° C. and equal to or lower than 200° C.

At temperatures within the range, the sublimation dyes 12 can diffuse better in particles of the polyester-based resin. Therefore, the resulting printed materials are even richer and more vivid in color.

The printing method according to the embodiment of the invention forms the medium 200 from a material that promotes the sublimation dyes 12 to diffuse in the medium 200 when heated during the heating step.

Since the sublimation dyes 12 are diffused in the medium 200 as well, the obtained printed materials are excellent in resistance to scuffing.

The printing method according to the embodiment of the invention uses a polyester-based resin as the material of the medium 200.

The sublimation dyes 12 can easily permeate into the polyester-based resin of the medium 200 during the heating step. The obtained printed materials are accordingly excellent in resistance to scuffing.

The invention includes but is not necessarily limited to the embodiments described thus far and can be variously modified within the scope of the invention defined in the appended claims. The invention encompasses in its technical scope any other embodiments obtained by optionally combining the technical means disclosed in the embodiments.

INDUSTRIAL APPLICABILITY

The invention is advantageous for printing using sublimation dyes.

The invention claimed is:
1. A printing method, comprising:
an ink applying step, for applying an ink on a recording medium, and the ink containing: binder resin particles in which a sublimation dye is enclosed and a solvent, and the binder resin particles are directly dispersed or emulsified in the solvent; and
a heating step, for heating the ink applied on the recording medium to diffuse the sublimation dye within the binder resin particles for color development,
the sublimation dye are incorporated and enclosed in a resin matrix when producing the binder resin particles, wherein the binder resin particles are formed into a film by bonding a binder resin of the binder resin particles to each other, the ink applying step further comprises: a film forming step of evaporating the solvent from the ink applied on the recording medium so as to form the film containing the binder resin, in the heating step, the film is heated, and the sublimation dye is sublimated and diffused into the film so that the film is color-developed.

2. The printing method as claimed in claim 1, wherein the binder resin particles contain a polyester-based resin and the sublimation dye.

3. The printing method as claimed in claim 2, wherein the heating step heats the recording medium to a temperature equal to or higher than 100° C. and equal to or lower than 200° C.

4. The printing method as claimed in claim 1, wherein the recording medium is formed from a material that promotes the sublimation dye to diffuse in the recording medium, when heated during the heating step.

5. The printing method as claimed in claim 4, wherein the recording medium is formed from a polyester-based resin.

6. The printing method as claimed in claim 2, wherein the recording medium is formed from a material that promotes the sublimation dye to diffuse in the recording medium, when heated during the heating step.

7. The printing method as claimed in claim 3, wherein the recording medium is formed from a material that promotes the sublimation dye to diffuse in the recording medium, when heated during the heating step.

8. The printing method as claimed in claim 1, wherein the sublimation dye is enclosed and dispersed uniformly in the binder resin particles.

* * * * *